(12) United States Patent
Kiuchi

(10) Patent No.: US 8,145,065 B2
(45) Date of Patent: Mar. 27, 2012

(54) LOW-FREQUENCY SIGNAL OPTICAL TRANSMISSION SYSTEM AND LOW-FREQUENCY SIGNAL OPTICAL TRANSMISSION METHOD

(75) Inventor: Hitoshi Kiuchi, Tokyo (JP)

(73) Assignee: Natural Institutes of Natural Sciences, Tokyo (JP)

( * ) Notice: Subject to any disclaimer, the term of this patent is extended or adjusted under 35 U.S.C. 154(b) by 227 days.

(21) Appl. No.: 12/700,411

(22) Filed: Feb. 4, 2010

(65) Prior Publication Data

US 2011/0076027 A1    Mar. 31, 2011

(30) Foreign Application Priority Data

Sep. 25, 2009   (JP) .................... 2009-220430

(51) Int. Cl.
*H04B 10/00*   (2006.01)

(52) U.S. Cl. ......... 398/159; 398/158; 398/160; 398/161

(58) Field of Classification Search .......... 398/158–161
See application file for complete search history.

(56) References Cited

U.S. PATENT DOCUMENTS

| | | | |
|---|---|---|---|
| 7,373,131 B2 * | 5/2008 | Matsuno | 455/302 |
| 7,974,541 B2 * | 7/2011 | Kiuchi | 398/159 |
| 2004/0259497 A1 * | 12/2004 | Dent | 455/13.3 |

OTHER PUBLICATIONS

Jean-Francios Cliche and Bill Shillue; Precision timing control for Radioastronomy; Feb. 2008; IEEE control Syatems Magazine pp. 19-26.*

* cited by examiner

*Primary Examiner* — Kenneth N Vanderpuye
*Assistant Examiner* — Amritbir Sandhu
(74) *Attorney, Agent, or Firm* — Birch, Stewart, Kolasch & Birch, LLP

(57) ABSTRACT

The system includes: a two-light wave generator for generating light beams having wavelengths $\lambda_1$ and $\lambda_2$ that are spaced apart by a frequency of a signal M1 from a laser; a photodetector for detecting a signal M2 from the light beams transmitted through an optical fiber; an optical modulator for frequency-shifting the light beams by a frequency of a signal M3; a Faraday reflector for reflecting the light beams; an optical coupler for mixing the light beams that have been returned to a polarization beam splitter, with the generated light beams; a photodetector for converting the light beams into microwave signals; an image rejection mixer for frequency-converting the signals obtained through the conversion by using the signal M1 to output a two side bands; and a phase difference detector for detecting a phase difference between the side bands, and controlling a phase shifter so that the phase difference becomes 0.

2 Claims, 7 Drawing Sheets

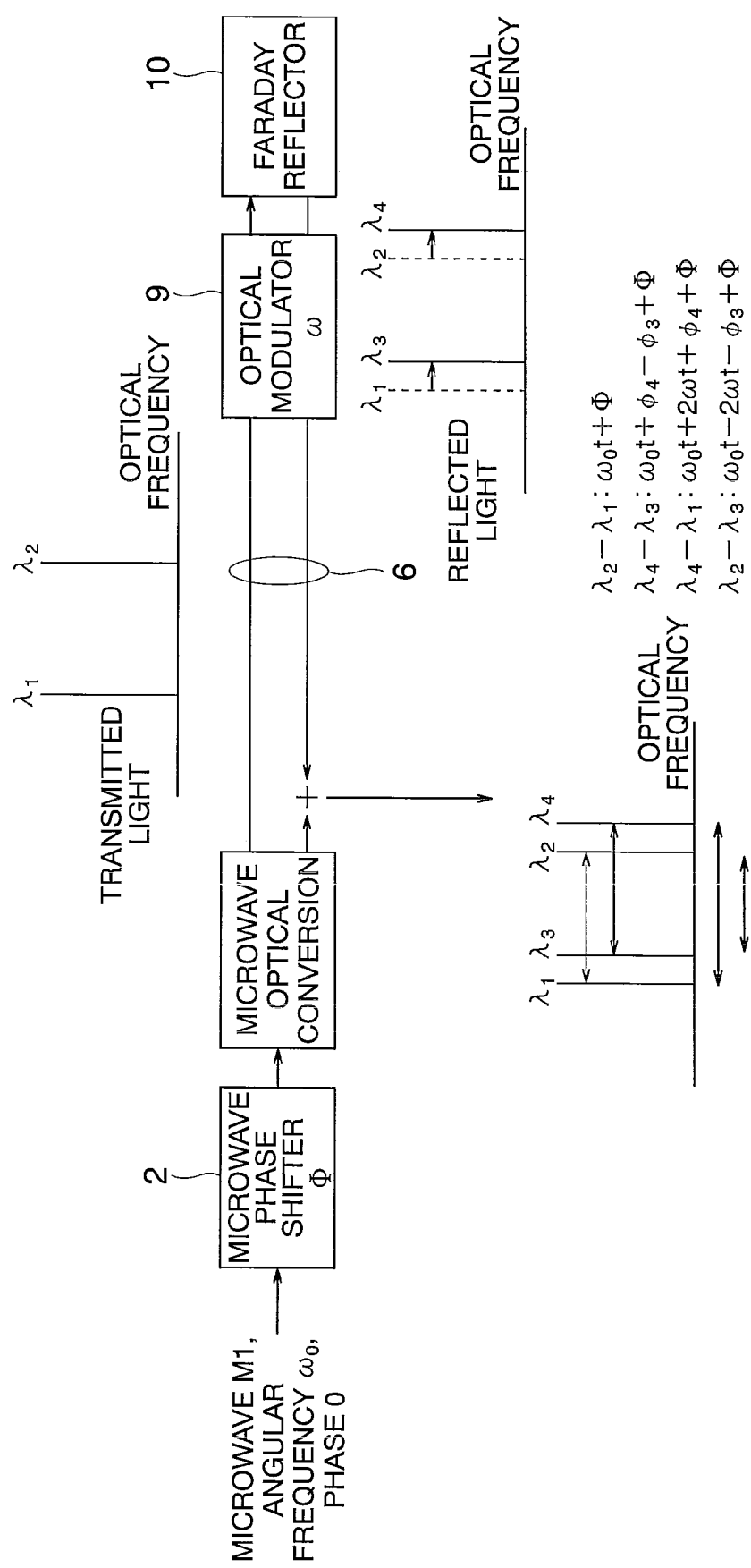

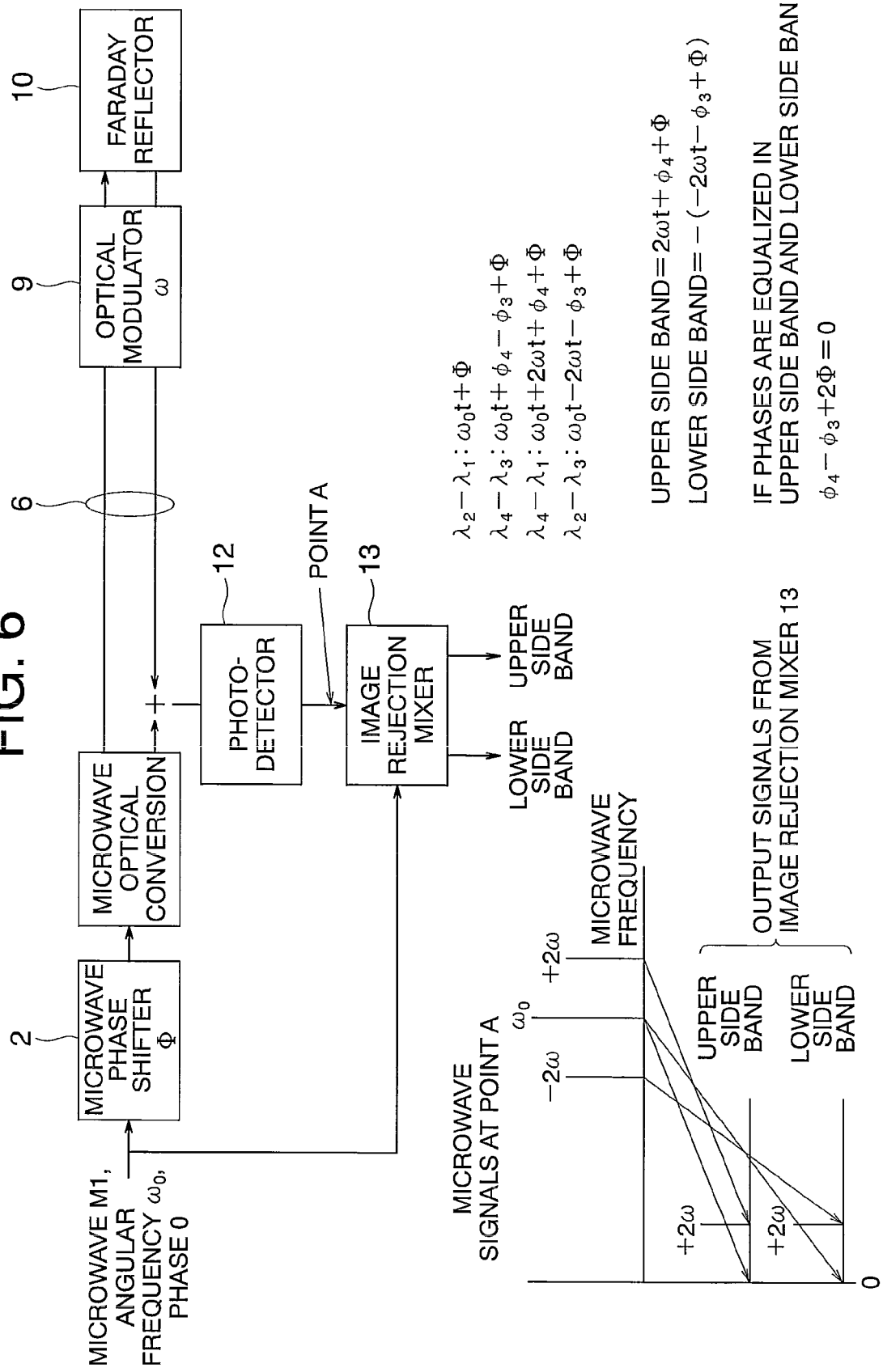

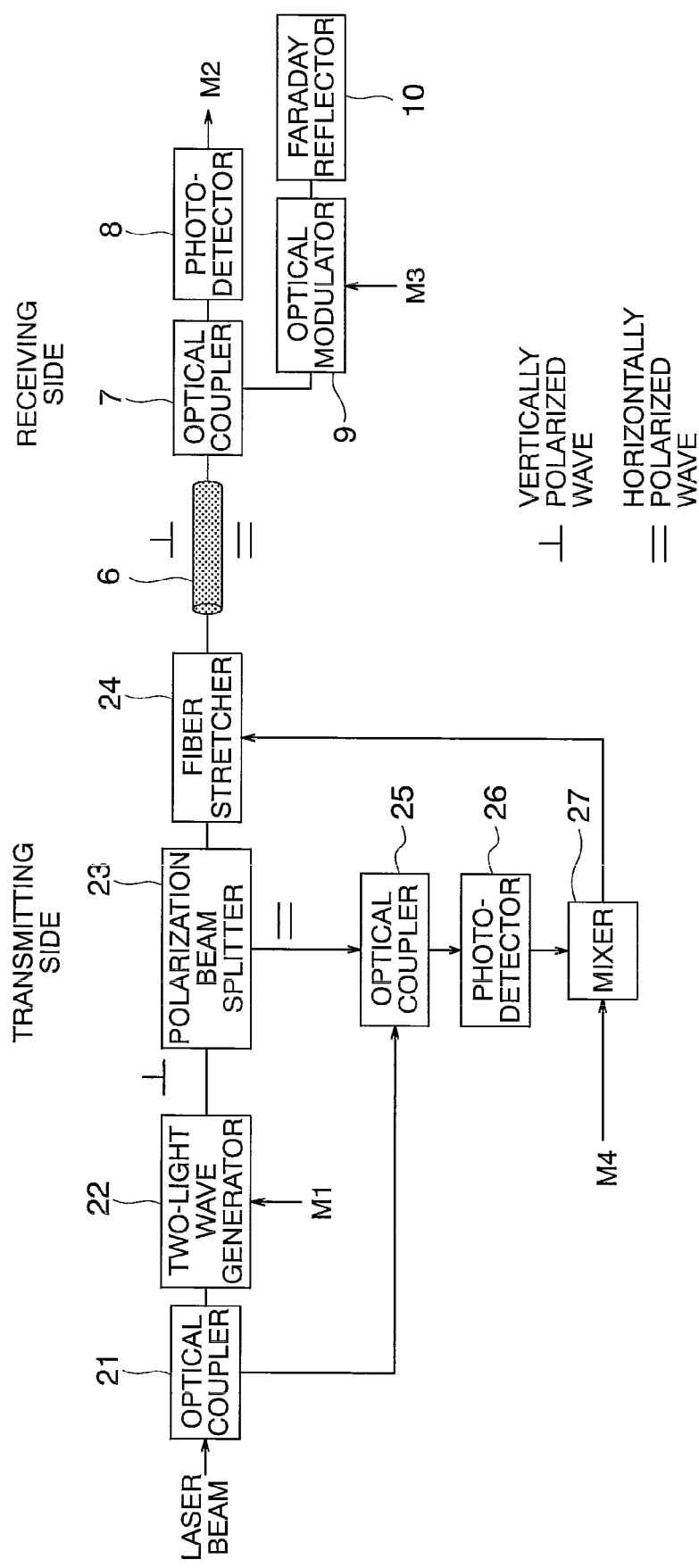

LOW-FREQUENCY SIGNAL OPTICAL TRANSMISSION SYSTEM AND LOW-FREQUENCY SIGNAL OPTICAL TRANSMISSION METHOD

BACKGROUND OF THE INVENTION

1. Field of the Invention

The present invention relates to a low-frequency signal optical transmission system and a low-frequency signal optical transmission method, which optically enable a long distance transmission of a low-frequency signal (sine wave) with high stability by compensating a phase delay amount caused by the transmission. In particular, the present invention relates to a low-frequency signal optical transmission system and a low-frequency signal optical transmission method which are suitable for an optical transmission at a low frequency equal to or lower than 20 GHz.

2. Description of the Related Art

FIG. 7 is a diagram illustrating a configuration of a conventional optical transmission system (see, for example, J. Francois and B. Shillue, "Precision timing control for radio astronomy", IEEE control systems magazine, 19-27, Feb. 2006). Referring to FIG. 7, a laser beam is distributed by an optical coupler 21 on a transmitting side, and two coherent optical signals that are different in wavelength are generated from one of the laser beams thus obtained by a two-light wave generator 22 by using a microwave signal M1. Thus, are two optical signals (wavelengths $\lambda_1$ and $\lambda_2$) that are spaced apart by a frequency of the microwave signal M1 are generated. The wavelength $\lambda_1$ is the same as that of the input laser beam, while the wavelength $\lambda_2$ is generated by another laser as a signal that is phase-locked to the wavelength $\lambda_1$. The microwave signal M1 is a highly-stable signal to be transmitted. The two-light wave generator 22 is configured so as to satisfy a condition that the two optical signals be polarized in the same manner.

The two optical signals serving as vertically polarized waves are guided to a polarization beam splitter 23, and pass through a fiber stretcher 24. The two optical signals are further distributed by an optical coupler 7 on a receiving side after passing through an optical fiber 6. One set of the two optical signals are guided to a photodetector 8, and output as a microwave signal M2.

The remaining one set of the two optical signals that have been distributed by the optical coupler 7 are frequency-shifted by a frequency of a microwave signal M3 by an optical modulator 9 as a round-trip signal, and then reflected by a Faraday reflector 10. The Faraday reflector 10 applies 90-degree Faraday rotation to the optical signals, and hence the remaining one set of the two optical signals are reflected as optical signals different in polarization by 90 degrees.

The reflected lights from the Faraday reflector 10 are again frequency-shifted by the frequency of the microwave signal M3 by the optical modulator 9, and then pass through the optical coupler 7, the optical fiber 6, and the fiber stretcher 24 to be returned to the polarization beam splitter 23. In consideration of photoreversibility, the optical signals returned from the receiving side are the optical signals different in polarization by 90 degrees, and hence are horizontally polarized waves. Therefore, the optical signals are guided to an optical coupler 25 by the polarization beam splitter 23.

The remaining one of the optical signals having the wavelength $\lambda_1$ distributed by the optical coupler 21 and the two optical signals guided by the polarization beam splitter 23 are mixed by the optical coupler 25. The two optical signals output from the polarization beam splitter 23 are different in frequency from the optical signal output from the optical coupler 21 by a frequency twice as high as that of the microwave signal M3. The optical signals mixed by the optical coupler 25 are detected as microwave beat signals by a photodetector 26. A round-trip measurement only for the optical signal having the wavelength $\lambda_1$ is performed. The beat frequency is the frequency twice as high as that of the microwave signal M3. The beat frequency is multiplied by a mixer 27 by a shift frequency of a microwave signal M4 having a frequency twice as high as that of the microwave signal M3, and an error signal is used for controlling the fiber stretcher 24.

However, the conventional technology raises the following problems. That is, the shift frequency of the microwave signal M3 is provided to distinguish between a transmitted signal and a returned signal, which is a low-frequency signal. A measurement is performed only for a phase of one optical signal, and hence the microwave signal M3 exerts an influence upon a measurement result. Therefore, the microwave signal M3 and the microwave signal M4 having the shift frequency twice as high as that of the microwave signal M3 need to be phase-locked through some method. Further, a disturbance that has occurred during the transmission through the optical fiber 6 exerts an influence upon the measurement result because the measurement is performed only for the phase of one optical signal. In addition, there arises such a problem that an influence of polarization made dispersion (PMD) cannot be removed because the measurement is performed only for the phase of one optical signal.

SUMMARY OF THE INVENTION

The present invention has been made to solve the above-mentioned problems, and therefore an object thereof is to provide a low-frequency signal optical transmission system and a low-frequency signal optical transmission method which optically enable a long distance transmission of a low-frequency signal (sine wave) with high stability by causing optical signals to make a round trip through one optical fiber and compensating a phase delay amount caused by the transmission.

The present invention provides a low-frequency signal optical transmission system for performing a long distance transmission of a low-frequency signal through an optical fiber, including: a microwave distributor for distributing a first microwave signal serving as the low-frequency signal; a microwave phase shifter for phase-shifting one of the first microwave signals distributed by the microwave distributor; a two-light wave generator for generating an optical signal having a first wavelength and an optical signal having a second wavelength from an input laser beam by using the one of the first microwave signals phase-shifted by the microwave phase shifter, the first wavelength and the second wavelength being spaced apart by a frequency of the first microwave signal; a first optical coupler for distributing the optical signal having the first wavelength and the optical signal having the second wavelength generated by the two-light wave generator; a polarization beam splitter for guiding one set of the optical signal having the first wavelength and the optical signal having the second wavelength distributed by the first optical coupler to the optical fiber; a second optical coupler for distributing the one set of the optical signal having the first wavelength and the optical signal having the second wavelength that have been transmitted through the optical fiber; a first photodetector for detecting a second microwave signal from one set of the optical signal having the first wavelength and the optical signal having the second wavelength distributed by the second optical coupler; an optical modulator for frequency-shifting another set of the optical signal having the first wavelength and the optical signal having the second wavelength distributed by the second optical coupler by a frequency of a third microwave signal; a Faraday reflector for applying 90-degree Faraday rotation to the another set of the optical signal having the first wavelength and the optical signal having the second wavelength frequency-shifted by the optical modulator and reflecting the another set of the optical signal having the first wavelength and the optical signal having the second wavelength; a third optical coupler for mixing the another set of the optical signal having the first wavelength and the optical signal having the second wavelength that have been reflected by the Faraday reflector, frequency-shifted by the optical modulator again, transmitted by the second optical coupler and through the optical fiber, and guided by the polarization beam splitter, with another set of the optical signal having the first wavelength and the optical signal having the second wavelength distributed by the first optical coupler; a second photodetector for converting four optical signals obtained through the mixing performed by the third optical coupler into microwave signals; an image rejection mixer for frequency-converting the microwave signals obtained through the converting performed by the second photodetector, by using another one of the first microwave signals distributed by the microwave distributor to output an upper side band and a lower side band; and a phase difference detector for detecting a phase difference between the upper side band and the lower side band that have been output by the image rejection mixer, and controlling the microwave phase shifter so that the phase difference becomes 0.

The low-frequency signal optical transmission system according to the present invention produces an effect of optically enabling the long distance transmission of the low-frequency signal (sine wave) with high stability by compensating the phase delay amount caused by the transmission.

BRIEF DESCRIPTION OF THE DRAWINGS

In the accompanying drawings:

FIG. 5 is a diagram illustrating a configuration of parts of the low-frequency signal optical transmission system on the transmitting side and a receiving side according to the embodiment of the present invention;

FIG. 6 is a diagram illustrating a configuration of parts of the low-frequency signal optical transmission system on the transmitting side and the receiving side according to the embodiment of the present invention; and FIG. 7 is a diagram illustrating a configuration of a conventional optical transmission system.

DETAILED DESCRIPTION OF THE PREFERRED EMBODIMENT

Hereinafter, description is made of a low-frequency signal optical transmission system according to a preferred embodiment of the present invention with reference to the accompanying drawings.

Figure 1:
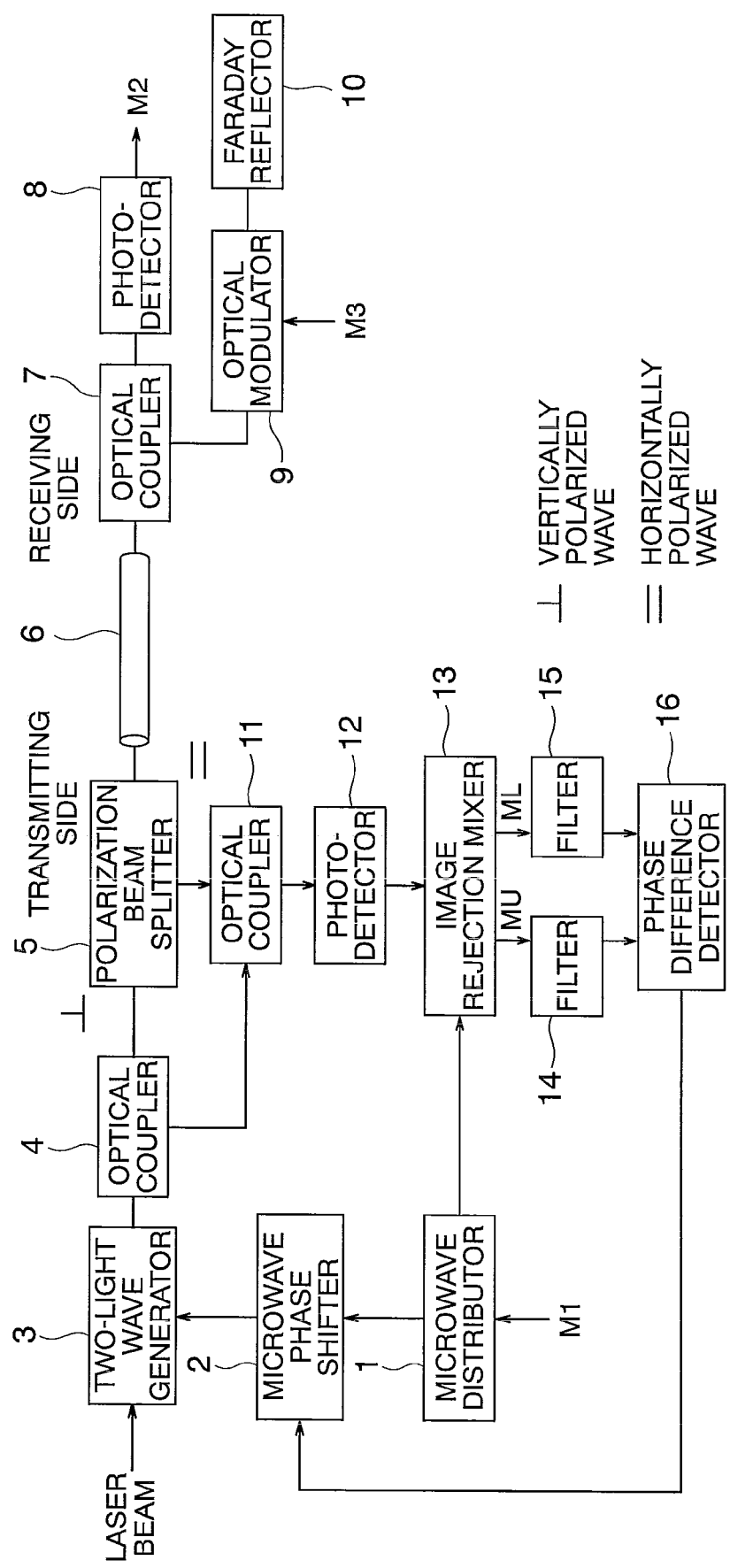
FIG. 1 is a diagram illustrating a configuration of a low-frequency signal optical transmission system according to an embodiment of the present invention.

By referring to FIGS. 1 to 6, description is made of a low-frequency signal optical transmission system according to an embodiment of the present invention. FIG. 1 is a diagram illustrating a configuration of the low-frequency signal optical transmission system according to the embodiment of the present invention. Note that the same or equivalent parts across the drawings are denoted by the same reference symbols.

In FIG. 1, the low-frequency signal optical transmission system according to the embodiment of the present invention includes, on a transmitting side thereof, a microwave distributor 1 for distributing a microwave signal M1, a microwave phase shifter 2 for phase-shifting the microwave signal M1, a two-light wave generator 3 for generating two optical signals (wavelengths $\lambda_1$ and $\lambda_2$) that are spaced apart by a frequency of the microwave signal M1, an optical coupler 4 for distributing the optical signal, a polarization beam splitter 5, an optical coupler 11 for mixing the optical signals, a photodetector 12 for converting the optical signal into a microwave signal, an image rejection mixer 13 for frequency-converting the microwave signal, a filter 14, a filter 15, and a phase difference detector 16 for detecting a phase difference.

In addition, the low-frequency signal optical transmission system according to the embodiment includes, on a receiving side thereof, an optical coupler 7 for distributing the optical signal, a photodetector 8 for converting the optical signal into a microwave signal, an optical modulator 9 for frequency-shifting the optical signal by a frequency of a microwave signal M3, and a Faraday reflector 10 for reflecting the optical signal by applying 90-degree Faraday rotation thereto.

Next, description is made of an operation of the low-frequency signal optical transmission system according to the embodiment with reference to the accompanying drawings.

Figure 2:
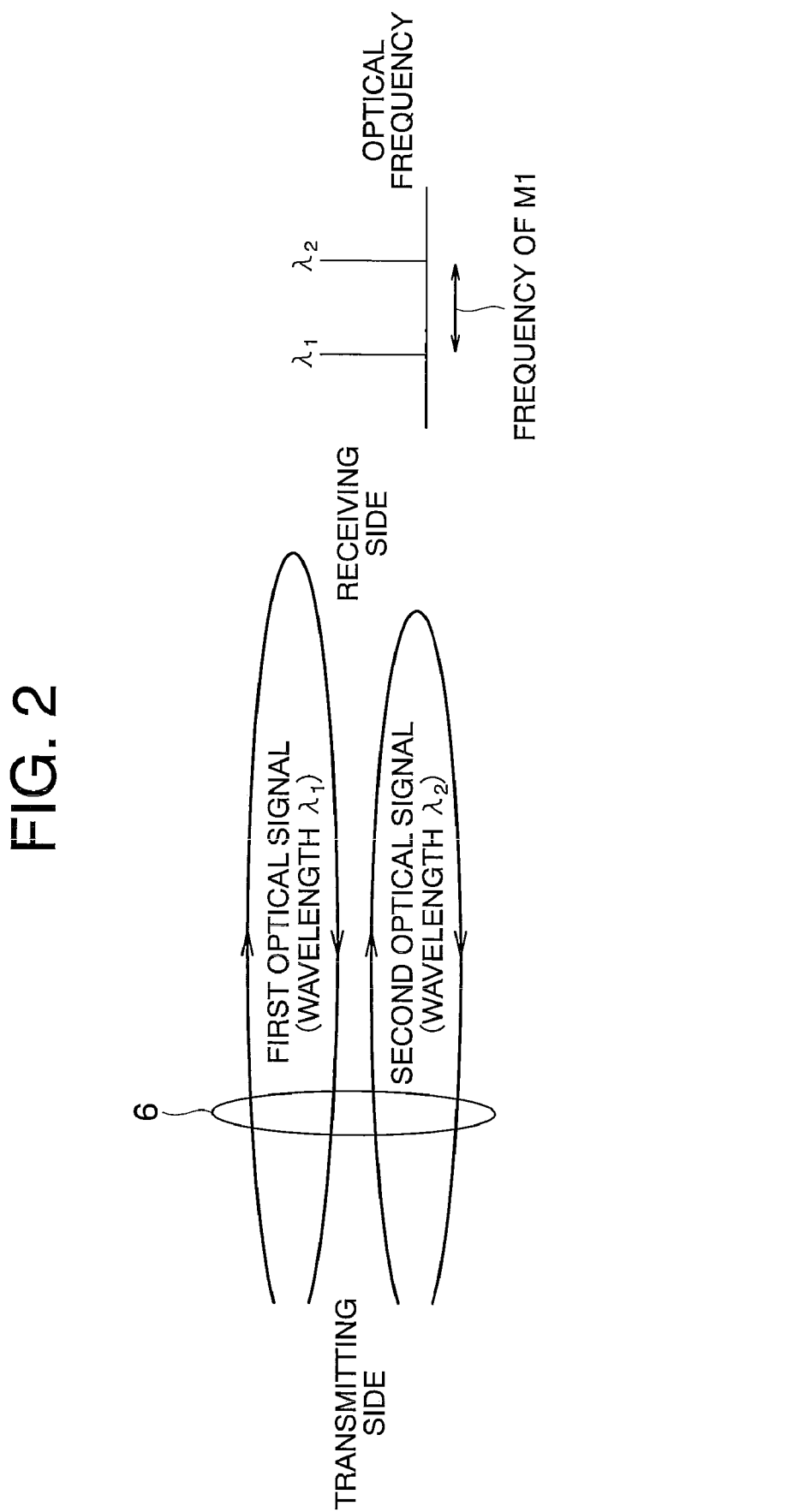
FIG. 2 is a diagram illustrating two optical signals that are different in wavelength which make a round trip through one optical fiber.

FIG. 2 is a diagram illustrating two optical signals different in wavelength which make a round trip through one optical fiber.

A microwave signal transmission by way of the optical signal is performed by using the two optical signals different in wavelength (wavelengths $\lambda_1$ and $\lambda_2$). A frequency difference (phase difference) between the two optical signals corresponds to the frequency of the microwave signal M1 to be transmitted.

In FIG. 2, a left end thereof corresponds to an optical signal transmitting side, while a right end thereof corresponds to a receiving side as a transmission destination. In this case, the frequency of the microwave signal M1 to be transmitted corresponds to the frequency difference between the two optical signals. The frequency difference is extracted as a microwave signal M2 due to the action of the photodetector 8 as a mixer on the receiving side at the right end. Round trips made by a first optical signal and a second optical signal are illustrated with different lengths in order to indicate that delay amounts of the two optical signals are different from each other due to polarization mode dispersion (PMD) based on the wavelength difference.

In an optical fiber transmission, the delay amounts of the two optical signals are different from each other, which makes a correction thereof essential. For realization thereof, it is possible to separate the two optical signals and assemble a phase control system, but it is difficult to separate the two optical signals at a frequency equal to or lower than 20 GHz. Therefore, the optical signals are converted into microwave signals, and then the two signals are separated.

Figure 3:
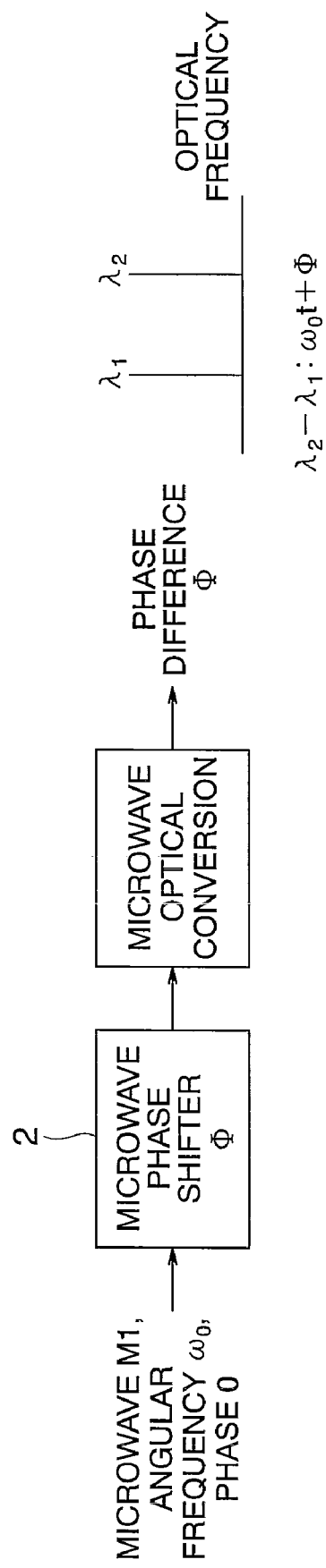
FIG. 3 is a diagram illustrating a configuration of a part of the low-frequency signal optical transmission system on a transmitting side according to the embodiment of the present invention.

FIG. 3 is a diagram illustrating a configuration of a part of the low-frequency signal optical transmission system on the transmitting side according to the embodiment of the present invention.

FIG. 3 illustrates a relationship between phases of the microwave and the optical signal. As illustrated in FIG. 3, it is assumed that the microwave signal M1 to be input has an angular frequency of $\omega_0$ and a phase of 0. If a microwave optical conversion is performed by the two-light wave generator 3 after the phase is shifted by $\Phi$ by the microwave phase shifter 2, the two optical signals (wavelengths $\lambda_1$ and $\lambda_2$) having a phase difference $\Phi$ are output. The phase difference between the two optical signals having the wavelengths $\lambda_2$ and $\lambda_1$ is ($\omega_0 t + \Phi$).

Figure 4:
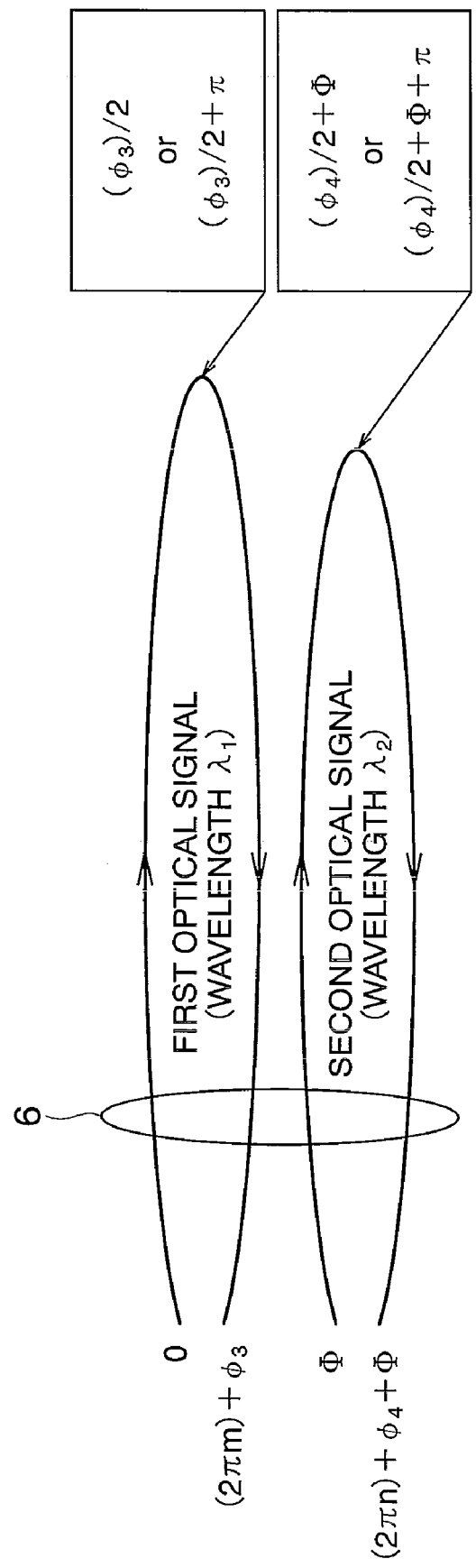
FIG. 4 is a diagram illustrating a relationship between phases of the two optical signals.

FIG. 4 is a diagram illustrating a relationship between the phases of the two optical signals.

It is assumed as illustrated in FIG. 4 that the optical signal having the wavelength $\lambda_1$ which has been returned from the round trip through an optical fiber 6 has a phase of ($2\pi m + \phi_3$), and that the optical signal having the wavelength $\lambda_2$ which has been returned from the round trip has a phase of ($2\pi n + \phi_4 + \Phi$). In this case, it is assumed that the optical signal of the wavelength $\lambda_2$ has an initial phase of $\Phi$.

Here, the optical signal makes a round trip through the one optical fiber 6, and hence the transmission destination at the right end is regarded as a midpoint of the round trip. The phase of the optical signal having the wavelength $\lambda_1$ at the midpoint is ($\phi_3/2$) when m is an even number and (($\phi_3/2)+\pi$) when m is an odd number. In the same manner, the phase of the optical signal having the wavelength $\lambda_2$ at the midpoint is (($\phi_4/2)+\Phi$) when n is an even number and (($\phi_4/2)+\Phi+\pi$) when n is an odd number. The phase detected by the photodetector 8 on the receiving side as the transmission destination is obtained as the phase difference signal therebetween, and is hence ((($\phi_4-\phi_3)/2)+\Phi$) or ((($\phi_4-\phi_3)/2)+\Phi+\pi$). This depends upon the combination of (m, n), which may include (odd number, odd number), (odd number, even number), (even number, odd number), and (even number, even number). The phase is ((($\phi_4-\phi_3)/2)+\Phi$) in the case of (odd number, odd number) and (even number, even number), and ((($\phi_4-\phi_3)/2)+\Phi+\pi$) in the case of (odd number, even number) and (even number, odd number).

FIG. 5 is a diagram illustrating a configuration of parts of the low-frequency signal optical transmission system on the transmitting side and the receiving side according to the embodiment of the present invention.

FIG. 5 illustrates a configuration for distinguishing between transmitted light and reflected light in the round trip. As illustrated in FIG. 5, in order to distinguish between the transmitted light and the reflected light, the optical modulator 9 and the Faraday reflector 10 are used on the receiving side to shift the frequencies of the round-trip optical signals by $2\omega$ (round trip). The value $\omega$ is assumed to be much smaller than the angular frequency $\omega_0$ of the microwave signal M1.

It is assumed here that a frequency-shifted signal with respect to the optical signal having the wavelength $\lambda_1$ is represented as "$\lambda_3$", and that a frequency-shifted signal with respect to the optical signal having the wavelength $\lambda_2$ is represented as "$\lambda_4$". If the reflected optical signals and the transmitted optical signals that have been subjected to such a frequency shifting processing are mixed by the optical coupler 11, the four optical signals having the wavelengths $\lambda_1, \lambda_2, \lambda_3$, and $\lambda_4$ are obtained. Frequency and phase relationships among those optical signals are obtained as follows:

($\omega_0 t + \Phi$) as a difference between $\lambda_2$ and $\lambda_1$;

($\omega_0 t + \phi_4 - \phi_3 + \Phi$) as a difference between $\lambda_4$ and $\lambda_3$;

($\omega_0 t + 2\omega t + \phi_4 + \Phi$) as a difference between $\lambda_4$ and $\lambda_1$; and ($\omega_0 t - 2\omega t - \phi_3 + \Phi$) as a difference between $\lambda_2$ and $\lambda_3$.

FIG. 6 is a diagram illustrating a configuration of parts of the low-frequency signal optical transmission system on the transmitting side and the receiving side according to the embodiment of the present invention.

As illustrated in FIG. 6, the photodetector 12 converts those four optical signals into microwave signals. The (difference between $\lambda_2$ and $\lambda_1$) and the (difference between $\lambda_4$ and $\lambda_3$) are the same as the frequency of the input microwave signal M1. The (difference between $\lambda_4$ and $\lambda_1$) is higher than the frequency of the input microwave signal M1 by $2\omega$, and the (difference between $\lambda_2$ and $\lambda_3$) is lower than the frequency of the input microwave signal M1 by $2\omega$. Those are frequency-converted by using the image rejection mixer 13 based on the input microwave signal M1. When signals corresponding to the (difference between $\lambda_2$ and $\lambda_1$) and the (difference between $\lambda_4$ and $\lambda_3$), which become a zero-hertz signal, are removed, the following are obtained:

$2\omega t + \phi_4 + \Phi$ in an upper side band MU; and $-(-2\omega t - \phi_3 + \Phi)$ in a lower side band ML.

The lower side band ML has a minus sign because the lower side band ML is inversed by the image rejection mixer 13.

Here, if a phase-locked loop is configured so that the upper side band MU and the lower side band ML have the same phase, the following equation is obtained.

$\phi_4 - \phi_3 + 2\Phi = 0$

If the equation is established by controlling the phase $\Phi$, the phase difference ((($\phi_4-\phi_3)/2)+\Phi$) or ((($\phi_4-\phi_3)/2)+\Phi+\pi$) between the optical fiber transmission signals at the transmission destination discussed with reference to FIG. 4 becomes 0 or $\pi$, which can compensate an influence of a transmission line as a constant value.

The signal to be transmitted is transmitted as the phase difference between the two optical signals (wavelengths $\lambda_1$ and $\lambda_2$), and hence the phase of the transmitted signal at the transmission destination at the right end of the long-distance optical fiber becomes the same as the signal phase on the transmitting side at the left end or a phase shifted precisely by $\pi$. It is possible to perform a long distance transmission of a low-frequency signal with stability without concern for an influence of the optical fiber 6. In this case, the influence is commonly exerted on the two optical signals (wavelengths $\lambda_1$ and $\lambda_2$) from external during the transmission through the optical fiber 6, and is hence canceled as a common noise by using the difference between the two optical signals (wavelengths $\lambda_1$ and $\lambda_2$) at the transmission destination at the right end.

In order to distinguish between the transmitted optical signals and the reflected optical signals (go and return) in the round trip, it is essential to provide the image rejection mixer 13 on the transmitting side and the optical modulator 9 on the receiving side. The phases of the two optical signals (wavelengths $\lambda_1$ and $\lambda_2$) caused by the round trip are detected by the photodetector 12 according to the Michelson interferometer principle as the signal phases of a frequency twice as high at the optical modulator 9 on the receiving side (right end) for separating the transmitted light and the received light, and converted into microwaves, which are then separated by the image rejection mixer 13. The microwave phase shifter 2 is controlled so as to achieve ($\phi_4-\phi_3+2\Phi=0$), thereby allowing a phase delay to be compensated.

Here, by referring to FIG. 1, description is made of an entire operation of the low-frequency signal optical transmission system according to the embodiment.

In FIG. 1, after passing through the microwave distributor 1, the input microwave signal M1 is sent to the microwave phase shifter 2 to be subjected to a phase shift. The microwave signal M1 is a highly-stable signal to be transmitted. An output from the microwave phase shifter 2 is sent to the two-light wave generator 3.

A laser beam is input to the two-light wave generator 3. The two-light wave generator 3 uses the output from the microwave phase shifter 2 to generate two coherent optical signals (wavelengths $\lambda_1$ and $\lambda_2$) that are different in wavelength and spaced apart by the frequency of the microwave signal M1. The two-light wave generator 3 is configured so as to satisfy a condition that the two optical signals be polarized in the same manner, or may be configured as an optical modulator such as an LN modulator or configured based on a scheme for generating the two optical signals by using a secondary laser phase-locked to the laser beam.

The two optical signals are vertically polarized waves and pass through the optical coupler 4 and the polarization beam splitter 5 on the transmitting side.

After that, the two optical signals pass through the optical fiber 6 and are distributed by the optical coupler 7 on the receiving side, and one set of the two optical signals are guided to the photodetector 8 and output as the microwave signal M2.

The remaining one set of the two optical signals that have been distributed by the optical coupler 7 are frequency-shifted by the frequency of the microwave signal M3 by the optical modulator 9 as a round-trip signal, and then reflected by the Faraday reflector 10. The Faraday reflector 10 applies 90-degree Faraday rotation to the optical signals, and hence the remaining one set of the two optical signals are reflected as optical signals different in polarization by 90 degrees. The reflected optical signals are again frequency-shifted by the frequency of the microwave signal M3 by the optical modulator 9.

After that, the reflected two optical signals pass through the optical coupler 7 and the optical fiber 6 to be returned to the polarization beam splitter 5 on the transmitting side. In consideration of photoreversibility, the returned optical signals are the optical signals different in polarization by 90 degrees, and hence are horizontally polarized waves. Therefore, the optical signals are guided to the optical coupler 11 by the polarization beam splitter 5.

The two optical signals reflected on the receiving side are mixed by the optical coupler 11 with the optical signals distributed by the optical coupler 4. The optical signals output from the polarization beam splitter 5 are different in frequency from the optical signal output from the optical coupler 4 by a frequency twice as high as that of the microwave signal M3. The optical signals that have passed through the optical coupler 11 are detected as microwave signals by the photodetector 12.

The detected microwave signals are obtained by mixing the (signal phase of the same frequency as that of the microwave signal M1), the (signal phase having a frequency higher than that of the microwave signal M1 by the frequency twice as high as that of the microwave signal M3), and the (signal phase having a frequency lower than that of the microwave signal M1 by the frequency twice as high as that of the microwave signal M3).

Those signals detected by the photodetector 12 are subjected to a frequency conversion by the image rejection mixer 13 by using the microwave signal M1 output from the microwave distributor 1. The upper side band MU and the lower side band ML are output from the image rejection mixer 13. (Signal phase having the frequency higher than that of the microwave signal M1 by the frequency twice as high as that of the microwave signal M3)−(phase of the microwave signal M1) appears in the upper side band MU, while (phase of the microwave signal M1)−(signal phase having the frequency lower than that of the microwave signal M1 by the frequency twice as high as that of the microwave signal M3) appears in the lower side band ML. Those are input to the filters 14 and 15.

Of the microwave signals detected by the photodetector 12, the microwave signals having the same frequency as that of the input microwave signal M1 are removed by the filters 14 and 15 as DC components. The filter 14 removes the signal having the same frequency as that of the microwave signal M1 from the upper side band MU as the DC component. In the same manner, the filter 15 removes the signal having the same frequency as that of the microwave signal M1 from the lower side band ML as the DC component. The signals that have passed through the filters 14 and 15 have a phase difference between the upper side band MU and the lower side band ML detected by the phase difference detector 16, and the microwave phase shifter 2 is controlled so that the phase difference becomes 0.

The phase difference detected by the phase difference detector 16 corresponds to a round trip through an optical cable. That is, an influence of a delay corresponding to the round trip due to the passing through the optical fiber 6 and the like is exerted upon the detected phase difference. Therefore, the half value of the phase difference detected by the phase difference detector 16 is determined as an additional phase based on the delay due to the optical fiber 6 and the like. Controlling the phase difference to be half becomes an obstacle in assembling the phase-locked loop, but the microwave phase shifter 2 is controlled to equalize the phases of the upper side band MU and the lower side band ML that have been input to the phase difference detector 16 to thereby obtain the same effect, which allows the microwave signal M2 to be phase-locked to the microwave signal M1.

The frequency of the microwave signal M3 is provided to distinguish between the transmitted optical signal and the reflected optical signal that has been returned, which is a low-frequency signal. An influence of the frequency of the microwave signal M3 and a disturbance that occurs during the transmission through the optical fiber 6 enter the two optical signals in the same manner, and can hence be handled as common mode noises, to thereby disappear if a phase angle is calculated as the phase difference between the upper side band MU and the lower side band ML output from the image rejection mixer 13. That is no influence is exerted upon the phase difference detected by the phase difference detector 16.

The present invention can be applied to a signal transmission field having an object to achieve the high stability of the reference signal transmission such as an interferometer, or the transmission or distribution of the highly-stable signal according to, for example, the national frequency standard, or applied to a field involving a problem of the transmission delay.

What is claimed is:
1. A low-frequency signal optical transmission system for performing a long distance transmission of a low-frequency signal through an optical fiber, comprising:
 a microwave distributor for distributing a first microwave signal serving as the low-frequency signal;
 a microwave phase shifter for phase-shifting one of the first microwave signals distributed by the microwave distributor;
 a two-light wave generator for generating an optical signal having a first wavelength and an optical signal having a second wavelength from an input laser beam by using the one of the first microwave signals phase-shifted by the microwave phase shifter, the first wavelength and the second wavelength being spaced apart by a frequency of the first microwave signal;

a first optical coupler for distributing the optical signal having the first wavelength and the optical signal having the second wavelength generated by the two-light wave generator;

a polarization beam splitter for guiding one set of the optical signal having the first wavelength and the optical signal having the second wavelength distributed by the first optical coupler to the optical fiber;

a second optical coupler for distributing the one set of the optical signal having the first wavelength and the optical signal having the second wavelength that have been transmitted through the optical fiber;

a first photodetector for detecting a second microwave signal from one set of the optical signal having the first wavelength and the optical signal having the second wavelength distributed by the second optical coupler;

an optical modulator for frequency-shifting another set of the optical signal having the first wavelength and the optical signal having the second wavelength distributed by the second optical coupler by a frequency of a third microwave signal;

a Faraday reflector for applying 90-degree Faraday rotation to the another set of the optical signal having the first wavelength and the optical signal having the second wavelength frequency-shifted by the optical modulator and reflecting the another set of the optical signal having the first wavelength and the optical signal having the second wavelength;

a third optical coupler for mixing the another set of the optical signal having the first wavelength and the optical signal having the second wavelength that have been reflected by the Faraday reflector, frequency-shifted by the optical modulator again, transmitted by the second optical coupler and through the optical fiber, and guided by the polarization beam splitter, with another set of the optical signal having the first wavelength and the optical signal having the second wavelength distributed by the first optical coupler;

a second photodetector for converting four optical signals obtained through the mixing performed by the third optical coupler into microwave signals;

an image rejection mixer for frequency-converting the microwave signals obtained through the converting performed by the second photodetector, by using another one of the first microwave signals distributed by the microwave distributor to output an upper side band and a lower side band; and a phase difference detector for detecting a phase difference between the upper side band and the lower side band that have been output by the image rejection mixer, and controlling the microwave phase shifter so that the phase difference becomes 0.

2. A low-frequency signal optical transmission method of performing a long distance transmission of a low-frequency signal through an optical fiber, comprising:

distributing, by a microwave distributor, a first microwave signal serving as the low-frequency signal;

phase-shifting, by a microwave phase shifter, one of the first microwave signals distributed by the microwave distributor;

generating, by a two-light wave generator, an optical signal having a first wavelength and an optical signal having a second wavelength from an input laser beam by using the one of the first microwave signals phase-shifted by the microwave phase shifter, the first wavelength and the second wavelength being spaced apart by a frequency of the first microwave signal;

distributing, by a first optical coupler, the optical signal having the first wavelength and the optical signal having the second wavelength generated by the two-light wave generator;

guiding, by a polarization beam splitter, one set of the optical signal having the first wavelength and the optical signal having the second wavelength distributed by the first optical coupler to the optical fiber;

distributing, by a second optical coupler, the one set of the optical signal having the first wavelength and the optical signal having the second wavelength that have been transmitted through the optical fiber;

detecting, by a first photodetector, a second microwave signal from one set of the optical signal having the first wavelength and the optical signal having the second wavelength distributed by the second optical coupler;

frequency-shifting, by an optical modulator, another set of the optical signal having the first wavelength and the optical signal having the second wavelength distributed by the second optical coupler by a frequency of a third microwave signal;

applying, by a Faraday reflector, 90-degree Faraday rotation to the another set of the optical signal having the first wavelength and the optical signal having the second wavelength frequency-shifted by the optical modulator and reflecting the another set of the optical signal having the first wavelength and the optical signal having the second wavelength;

mixing, by a third optical coupler, the another set of the optical signal having the first wavelength and the optical signal having the second wavelength that have been reflected by the Faraday reflector, frequency-shifted by the optical modulator again, transmitted by the second optical coupler and through the optical fiber, and guided by the polarization beam splitter, with another set of the optical signal having the first wavelength and the optical signal having the second wavelength distributed by the first optical coupler;

converting, by a second photodetector, four optical signals obtained through the mixing performed by the third optical coupler into microwave signals;

frequency-converting, by an image rejection mixer, the microwave signals obtained through the converting performed by the second photodetector, by using another one of the first microwave signals distributed by the microwave distributor to output an upper side band and a lower side band; and detecting, by a phase difference detector, a phase difference between the upper side band and the lower side band that have been output by the image rejection mixer, and controlling the microwave phase shifter so that the phase difference becomes 0.

* * * * *